United States Patent
Pasumansky (10) Patent No.: US 6,460,026 B1
(45) Date of Patent: Oct. 1, 2002

(54) MULTIDIMENSIONAL DATA ORDERING

(75) Inventor: Mosha Pasumansky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/281,053

(22) Filed: Mar. 30, 1999

(51) Int. Cl.[7] ............................................. G06F 17/30
(52) U.S. Cl. ............................... 707/1; 707/7; 707/100
(58) Field of Search ............................. 707/1–10, 101, 707/103, 104, 530; 345/424, 425, 426

(56) References Cited

U.S. PATENT DOCUMENTS

| | | | | |
|---|---|---|---|---|
| 5,359,724 A | * | 10/1994 | Earle | 707/205 |
| 5,799,300 A | * | 8/1998 | Agrawal et al. | 707/2 |
| 5,802,525 A | * | 9/1998 | Rigoutsos | 707/103 |
| 5,864,857 A | * | 1/1999 | Ohata et al. | 707/100 |
| 5,940,818 A | * | 8/1999 | Malloy et al. | 707/2 |
| 5,943,668 A | * | 8/1999 | Malloy et al. | 707/3 |
| 5,970,476 A | * | 10/1999 | Fahey | 707/1 |
| 6,134,541 A | * | 10/2000 | Castelli et al. | 707/2 |
| 6,182,060 B1 | * | 1/2001 | Hedgcock et al. | 707/1 |

OTHER PUBLICATIONS

Faloutsos, C., et al., "Analysis of the n–dimensional quadtree decomposition for arbitrary hyper–rectangles", Abstract—Department of Computer Science and the Institution for Systems Research at the University of Maryland, College Park, MD, pp. 1–20.

Faloutsos, C., et al., "Fracturals for Secondary Key Retrieval", Abstract—University of Maryland, College Park, 17 pages.

Moon, M., et al., "Analysis of the Clustering Properties of Hilbert Space–filling Curve", Abstract—Institute for Advanced Computer Studies and Department of Computer Science, Universisty of Maryland, College Park, MD, 25 pages, (1996).

\* cited by examiner

*Primary Examiner*—Kim Vu
*Assistant Examiner*—Anh Ly
(74) *Attorney, Agent, or Firm*—Woodcock Washburn LLP (57) ABSTRACT

A method, apparatus, software and data structure is disclosed for more efficient mapping of three dimensional data to linear storage mediums. These embodiments provide that multidimensional space is divided into volumes based on the priority of levels of one or more dimensions. Spatial to linear mapping is then applied to the multidimensional data such that records in the same volume will be close to each other. According to another aspect, a data structure is provided wherein data from a multidimensional space is stored in a one-dimensional space in a storage medium in accordance with the above-described method.

18 Claims, 6 Drawing Sheets

|         | 91-Q1 | 91-Q2 | 91-Q3 | 91-Q4 | 92-Q1 | 92-Q2 | 92-Q3 | 92-Q4 |
|---------|-------|-------|-------|-------|-------|-------|-------|-------|
| Seattle | 1     | 4     | 7     | 10    | 41    | 44    | 47    | 50    |
| SF      | 2     | 5     | 8     | 11    | 42    | 45    | 48    | 51    |
| LA      | 3     | 6     | 9     | 12    | 43    | 46    | 49    | 52    |
| Toronto | 13    | 15    | 17    | 19    | 53    | 55    | 57    | 59    |
| Montreal| 14    | 16    | 18    | 20    | 54    | 56    | 58    | 60    |
| Paris   | 21    | 24    | 27    | 30    | 61    | 64    | 67    | 70    |
| Nice    | 22    | 25    | 28    | 31    | 62    | 65    | 68    | 71    |
| Mars    | 23    | 26    | 29    | 32    | 63    | 66    | 69    | 72    |
| Rome    | 33    | 35    | 37    | 39    | 73    | 75    | 77    | 79    |
| Milan   | 34    | 36    | 38    | 40    | 74    | 76    | 78    | 80    |

PRIORITY OF LEVELS: YEAR-1, CONTINENT-2, COUNTRY-3, QUARTER-4, CITY-5

FIG. 4

|         | 91-Q1 | 91-Q2 | 91-Q3 | 91-Q4 | 92-Q1 | 92-Q2 | 92-Q3 | 92-Q4 |
|---------|-------|-------|-------|-------|-------|-------|-------|-------|
| Seattle | 1     | 4     | 7     | 10    | 21    | 24    | 27    | 30    |
| SF      | 2     | 5     | 8     | 11    | 22    | 25    | 28    | 31    |
| LA      | 3     | 6     | 9     | 12    | 23    | 26    | 29    | 32    |
| Toronto | 13    | 15    | 17    | 19    | 33    | 35    | 37    | 39    |
| Montreal| 14    | 16    | 18    | 20    | 34    | 36    | 38    | 40    |
| Paris   | 41    | 44    | 47    | 50    | 61    | 64    | 67    | 70    |
| Nice    | 42    | 45    | 48    | 51    | 62    | 65    | 68    | 71    |
| Mars    | 43    | 46    | 49    | 52    | 63    | 66    | 69    | 72    |
| Rome    | 53    | 55    | 57    | 59    | 73    | 75    | 77    | 79    |
| Milan   | 54    | 56    | 58    | 60    | 74    | 76    | 78    | 80    |

PRIORITY OF LEVELS: YEAR-1, CONTINENT-2, COUNTRY-3, QUARTER-4, CITY-5

FIG. 5

|         | 91-Q1 | 91-Q2 | 91-Q3 | 91-Q4 | 92-Q1 | 92-Q2 | 92-Q3 | 92-Q4 |
|---------|-------|-------|-------|-------|-------|-------|-------|-------|
| Seattle | 1     | 2     | 3     | 4     | 41    | 42    | 43    | 44    |
| SF      | 5     | 6     | 7     | 8     | 45    | 46    | 47    | 48    |
| LA      | 9     | 10    | 11    | 12    | 49    | 50    | 51    | 52    |
| Toronto | 13    | 14    | 15    | 16    | 53    | 54    | 55    | 56    |
| Montreal| 17    | 18    | 19    | 20    | 57    | 58    | 59    | 60    |
| Paris   | 21    | 22    | 23    | 24    | 61    | 62    | 63    | 64    |
| Nice    | 25    | 26    | 27    | 28    | 65    | 66    | 67    | 68    |
| Mars    | 29    | 30    | 31    | 32    | 69    | 70    | 71    | 72    |
| Rome    | 33    | 34    | 35    | 36    | 73    | 74    | 75    | 76    |
| Milan   | 37    | 38    | 39    | 40    | 77    | 78    | 79    | 80    |

PRIORITY OF LEVELS: YEAR-1, CONTINENT-2, COUNTRY-3, QUARTER-4, CITY-5

FIG. 6

```
                                                          60
                                                         ↙
PROCEDURE COMPARE

INPUT: CELL1              ⎫
      INPUT: CELL2              ⎬ 62
      OUTPUT: GREATER/EQUEAL/LESS ⎭

LOOP i=1,n

IF CELL1[Pi]>CELL2[Pi] THEN  ⎫
            RETURN OUTPUT: GREATER ⎬ 64
      END IF                       ⎭

IF CELL1[Pi]<CELL2[Pi] THEN  ⎫
            RETURN OUTPUT: LESS    ⎬ 66
      END IF                       ⎭

END LOOP

RETURN OUTPUT: EQUAL              ⎬ 68
```

MULTIDIMENSIONAL DATA ORDERING

COPYRIGHT NOTICE AND PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 1999, Microsoft, Inc.

TECHNICAL FIELD OF THE INVENTION

The present invention pertains generally to multidimensional data access methods, and more particularly to a system for mapping multidimensional space to one-dimensional space.

BACKGROUND OF THE INVENTION

On-Line Analytical Processing ("OLAP") is a key part of most data warehouse and business analysis systems. OLAP systems provide for the fast analysis of multidimensional information. For this purpose, OLAP provides for multidimensional access and navigation of data in an intuitive and natural way, providing a global view of data, but also allowing for fast drill down into data of interest. Speed and even response time is an important attribute of OLAP so that users can efficiently browse and analyze data on-line. Additionally, OLAP typically provides, for example, analytical tools to rank, aggregate, and calculate lead and lag indicators for the data under analysis.

Figure 1:
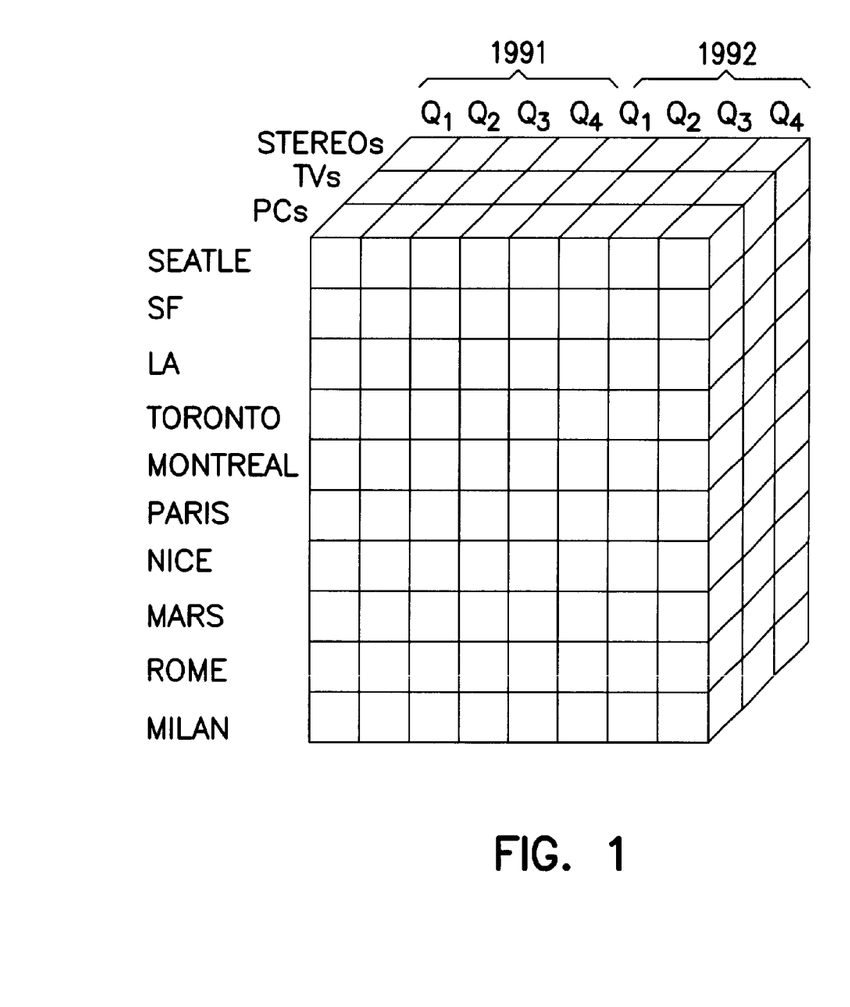
FIG. 1 illustrates a multidimensional space with three dimensions of data.

Referring to FIG. 1, there is illustrated a multidimensional space with three dimensions: product, region and time, wherein each cell in the space represents the dollar value (values not shown) of the itemized products. The products in this example are stereos, televisions (TV's) and personal computers (PC's). The regions in this example are Seattle, San Francisco (SF), Los Angeles (LA), Toronto, Montreal, Paris, Nice, Mars, Rome, and Milan. The time dimension is divided into the four quarters of 1991 and 1992, with 1991 and 1992 being aggregations of their respective quarters. Using OLAP, a user might, for example, choose to view sales by continent, such as America or Europe, as may be obtained by adding the sales for each city in the respective continent, or drill down and view sales in USA and Canada. Alternatively, a user may desire to compare sales in the years 1991 and 1992, or drill down and compare sales quarter to quarter. By navigating through the data in this manner, a user of an OLAP system can quickly create many different views of data and, hopefully, gain insight and knowledge from these views.

Figure 2A:
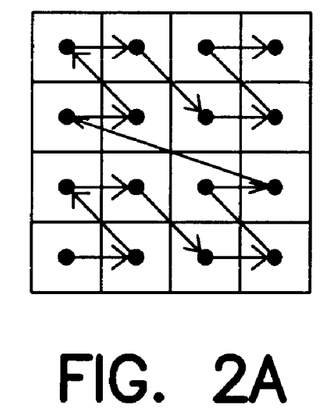
FIGS. 2A, 2B, and 2C illustrate three prior art methods for spatial to linear mapping.
Figure 2B:
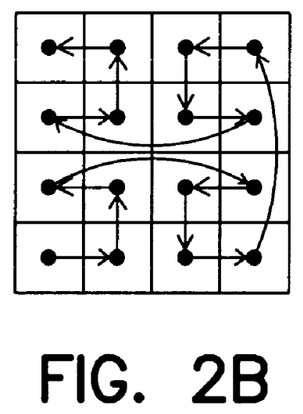
Figure 2C:
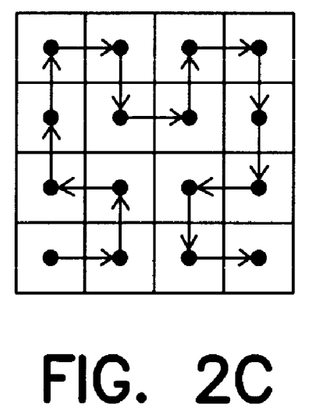

From a design perspective, OLAP systems present the related issues of the user's view and navigation of complex data, and how to store and represent the data to make viewing and navigation most efficient. As discussed in *Analysis of the Clustering Properties of Hilbert Space-filling Curve,* by Moon et al., available at URL http://www.cs.umd.edu/TR/UMCP-CSD:CS-TR-3611, the design of multidimensional access methods that fulfill the needs of OLAP is difficult as compared to one-dimensional cases because there is no total ordering that preserves spatial locality. When a suitable mapping function is applied to a given spatial database, a one-dimensional access method, such as B+-tree, may yield good performance for multidimensional queries. Referring to FIGS. 2A, 2B and 2C, there is shown three well known prior art space mapping functions, namely the z-curve, Gray coding and Hilbert curve. These methods generally attempt to cluster related multidimensional data in a linear storage medium such as a magnetic media or random access memory. For this purpose, all of these methods assume that the probability of fetching an adjacent member is uniformly distributed through dimensions of the database. However, this is not usually the case for data representative of measurements in real life. Also, these prior art methods tend to artificially divide dimensions by powers of two, which is also suboptimal in many cases.

SUMMARY OF THE INVENTION

As described more fully below, the embodiments of the invention provide for more efficient mapping of multidimensional data to the one-dimensional space of linear storage mediums. More specifically, these embodiments provide that multidimensional space is divided into volumes based on the priority of levels within the dimensions of the data. Spatial to linear mapping is then applied to the multidimensional data such that records or data with dimension members belonging to the same parent in the hierarchy will be close to each other across all dimensions.

According to yet another aspect of the invention, there is provided an on-line analytical processing system wherein data from a multidimensional space is stored in a one-dimensional space in a storage medium in accordance with the method outlined above.

According to still another aspect, the invention is embodied as a data structure wherein data from a multidimensional space is stored in a one-dimensional space in a storage medium in the structure outlined above.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 3:
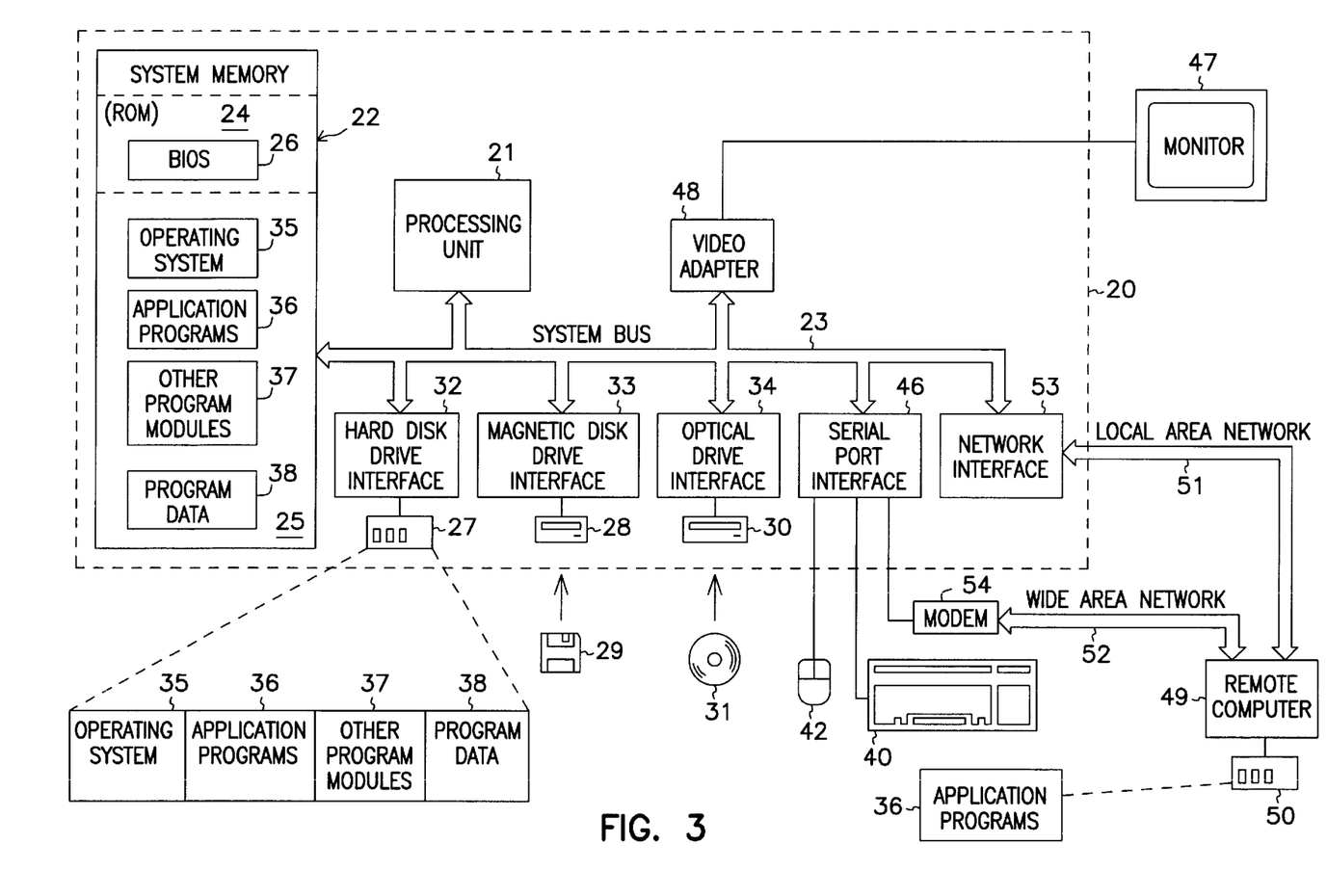
FIG. 3 illustrates a simplified overview of an example embodiment of a computing environment for the present invention.

Referring to FIG. 3, a diagram of the hardware and operating environment in conjunction with which embodiments of the invention may be practiced is shown. The description of FIG. 3 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 3 for implementing the invention includes a general purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored or encoded in a machine readable medium such as the hard disk, magnetic disk 29, optical disk 31, ROM 24, RAM 25, or an electrical signal such as an electronic data stream through a communications channel, including an operating system 35, one or more application programs 36, other program modules 37, and program data 38. As described below in more detail, operating system 35 may allocate memory such as RAM 25 into kernel-mode memory or user-mode memory. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 3. The logical connections depicted in FIG. 3 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Example Embodiments of the Invention

As described more fully below, the present invention provides for mapping multidimensional space to the linear, one-dimensional space (such as conventional storage mediums such as RAM memory, magnetic disk or tape media, or CD-ROM media) so as to improve the efficiency and speed of access for the most probable queries. To achieve this aim, the invention takes advantage of the hierarchical structure of the dimensions in multidimensional data. This hierarchical structure reflects the fact that a typical OLAP query asks about members from the same parent in the hierarchy. Thus, the mapping of the present invention provides that records or data with dimension members belonging to the same parent are close to each other across all dimensions. Thus, by clustering these members together, the typical OLAP query can be efficiently and quickly accomplished.

Figure 4:
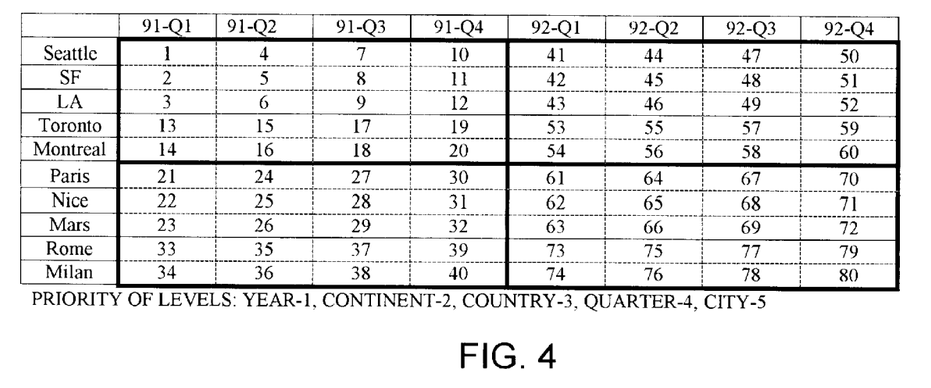
FIGS. 4, 5 and 6 illustrate an example embodiment of the invention for mapping of a two-dimensional space to a one-dimensional space.

Referring now to FIG. 4, there is illustrated an example embodiment of the invention. FIG. 4 illustrates a two-dimensional slice of the database of FIG. 1, showing sales of a product, such as for PC's. In this example, the x axis or dimension is time, and the y axis or dimension represents geographic region. The two-dimensional space is illustrated as comprising eighty (80) cells (10×8), with each cell containing data on the total yearly sales for the product, for each of the geographic regions listed along the y-axis. As illustrated in FIG. 4, dotted lines show separation between most low level volumes, thin lines the next level of volumes, and thick lines the highest level of volumes.

Further, in this example, the number inside each cell shows a simple ordering (no Z, no Hilbert ordering, etc.), according to the following levels of priority: Year—1, Continent—2, Country—3, Quarter—4, City—5. Accordingly, cells of the same year have the highest level of priority in ordering, with cells of the same continent the next highest level of priority, and so on. As this example illustrates, all of the cells of the same year are ordered within separate volumes (cells 1–40 and 41–80), all of the cells of the same continent within a given year are ordered within separate volumes (cells 1–20, 21–40, 41–60, and 61–80), all of the cells in the same country within a given continent within a given year within separate volumes (cells 1–12, 13–20, 21–32, 33–40, 41–52, 53–60, 61–72, 73–80), all of the cells in the same quarter within a given country within a given continent within a given year within separate volumes (cells 1–3, 4–6, 7–9 . . . 13–14, 15–16 . . . 21–23 . . . 33–34 . . . 41–43 . . . 53–54 . . . 61–63 . . . 73–74 . . . 79–80), with the city having no priority in the ordering.

Thus, when so ordered, this structure provides that all data pertaining to a given year may be obtained without traversing any data from a different year. Moreover, all data for a given continent for a given year may be obtained without referencing data for a different continent. Still further, within a given continent within a given year, all data for a given country may be obtained without reference to data for a different country. And, all data for a given quarter within a given country within a given continent within a given year, may be obtained without reference to a different quarter.

Figure 5:
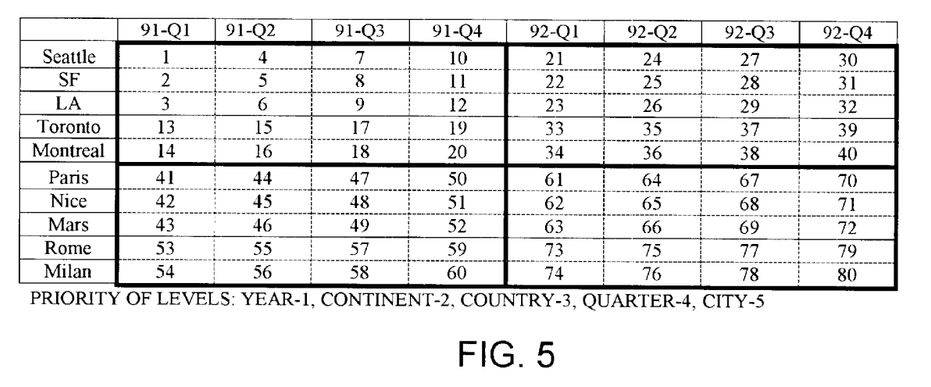

Referring to FIG. 5, there is illustrated another example ordering of data according to one example of the invention, wherein the order of priorities are as follows: Continent—1, Year—2, Country—3, Quarter—4, City—5. In this example, cells of the same continent have the highest level of priority in ordering, with cells of the same year the next highest level of priority, and so on. As this example illustrates, all of the cells of the same continent are ordered within separate volumes (cells 1–40 and 41–80), all of the cells of the same year within a given continent are ordered within separate volumes (cells 1–20, 21–40, 41–60, and 61–80), all of the cells in the same country within a given year within a given continent within separate volumes (cells 1–12, 13–20, 21–32, 33–40, 41–52, 53–60, 61–72, 73–80), and so on.

Thus, when so ordered, this structure provides that all data pertaining to a given continent may be obtained without traversing any data from a different continent. Moreover, all data for a given year for a given continent may be obtained without referencing data for a different year. Still further, within a given year within a given continent, all data for a given country may be obtained without reference to data for a different country. And, all data for a given quarter within a given country within a given year within a given continent, may be obtained without reference to a different quarter.

Figure 6:
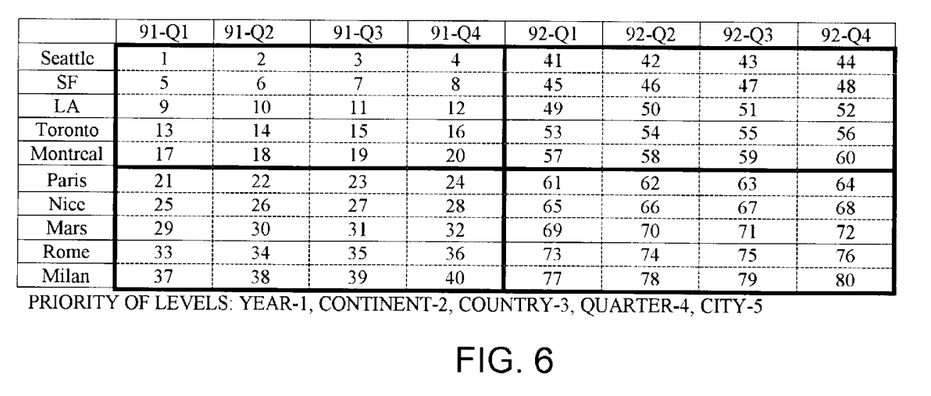

Referring to FIG. 6, there is illustrated another example ordering of data according to one example of the invention, wherein the order of priorities are as follows: Year—1, Continent—2, Country—3, Quarter—4, City—5. Thus, cells of the same year have the highest level of priority in ordering, with cells of the same continent the next highest level of priority, and so on. As this example illustrates, all of the cells of the same year are ordered within separate volumes (cells 1–40 and 41–80), all of the cells of the same continent within a given year are ordered within separate volumes (cells 1–20, 21–40, 41–60, and 61–80), all of the cells in the same country within a given continent within a given year within separate volumes (cells 1–12, 13–20, 21–32, 33–40, 41–52, 53–60, 61–72, 73–80), all of the cells in the same city within a given country within a given continent within a given year within separate volumes (cells 1–4, 5–8, 9–12, 13–16, 17–20 . . . 21–24 . . . 33–36 . . . 41–44 . . . 53–56 . . . 61–64 . . . 73–76, 77–80), with the quarter having no priority in the ordering.

Accordingly, when so ordered, this structure provides that all data pertaining to a given year may be obtained without traversing any data from a different year. Moreover, all data for a given continent for a given year may be obtained without referencing data for a different continent. Still further, within a given continent within a given year, all data for a given country may be obtained without reference to data for a different country. And, all data for a given quarter within a given country within a given continent within a given year, may be obtained without reference to a different quarter.

As the above examples illustrate, the present invention provides a systematic approach to ordering data in a multi-dimensional data structure based on the priorities assigned to volumes in the data structure. This ordering system allows for maximizing the speed of access of data according to the manner in which the data is actually used or most likely to be used. The goal of this mapping is to cluster as much data as possible, to minimize the number of disk accesses required for data retrieval when analyzing the multidimensional data. A "cluster" is defined as a continuous run of grid points or cells within a subspace represented by a given query on the multidimensional data. For the purposes of this illustration, it assumed that each grid point or cell (and the data contained therein) is mapped to one disk block of a disk storage device. Thus, if all the data required for a query can be read from continuous disk blocks (without reading unnecessary blocks between blocks of desired data), the access time is less than if the data for a query requires reading from non-consecutive blocks, which requires additional access seek time.

For instance, if data is analyzed principally by year, and less frequently by continent, the ordering of the example of FIG. 4 provides a more efficient data retrieval structure than the ordering of the example of FIG. 5, wherein the ordering favors the retrieval of data by continent over year. More particularly, in FIG. 4, all of the data for a given year is in one contiguous volume, facilitating quick retrieval of this data, while in FIG. 5, all the data for a given continent is in one contiguous volume, favoring quick retrieval of this data. FIG. 4 also illustrates the application of a prior art z-curve mapping function to map the two-dimensional space of grid points (centered in each cell) into a one-dimensional space.

The system of the present invention as demonstrated above may be formally represented as follows. Assume that there are k dimensions in the multidimensional data structure, (e.g. cube) and n levels in the structure (n is total number of levels in all dimensions). Then, every cell in the multidimensional structure is uniquely identified by $$Cell=(m_1, m_2, \ldots, m_n)$$

as may be represented by the notation $Cell[i]=m_i$ where $m_i$ is the member at the level i.

For the examples of the two dimensional structure or cube illustrated in FIGS. 4–6 above, k=2 and n=5. The levels for these examples are given as: Continent (1), Country (2), City (3), Year (4), Quarter (5). And, with respect to continents, America is first (1) and Europe is second (2). Within America, USA is first (1) and Canada is second (2). And within USA, Seattle is first (1), San Francisco is second (2) and Los Angeles is third (3), and so on. Accordingly, the cell corresponding to San Francisco, and 1992/Q4 is uniquely identified by (America, USA, San Francisco, 1992, Q4), which in its numeric representation is (1,1,2,2,4). And, for another example, Rome at 1992/Q3, has a numeric representation of (2,2,2,2,3). When a list of level priorities are chosen, the permutation of numbers (1,2, . . . ,n) to $(p_1, p_2, \ldots, p_n)$ are defined.

Figure 7:
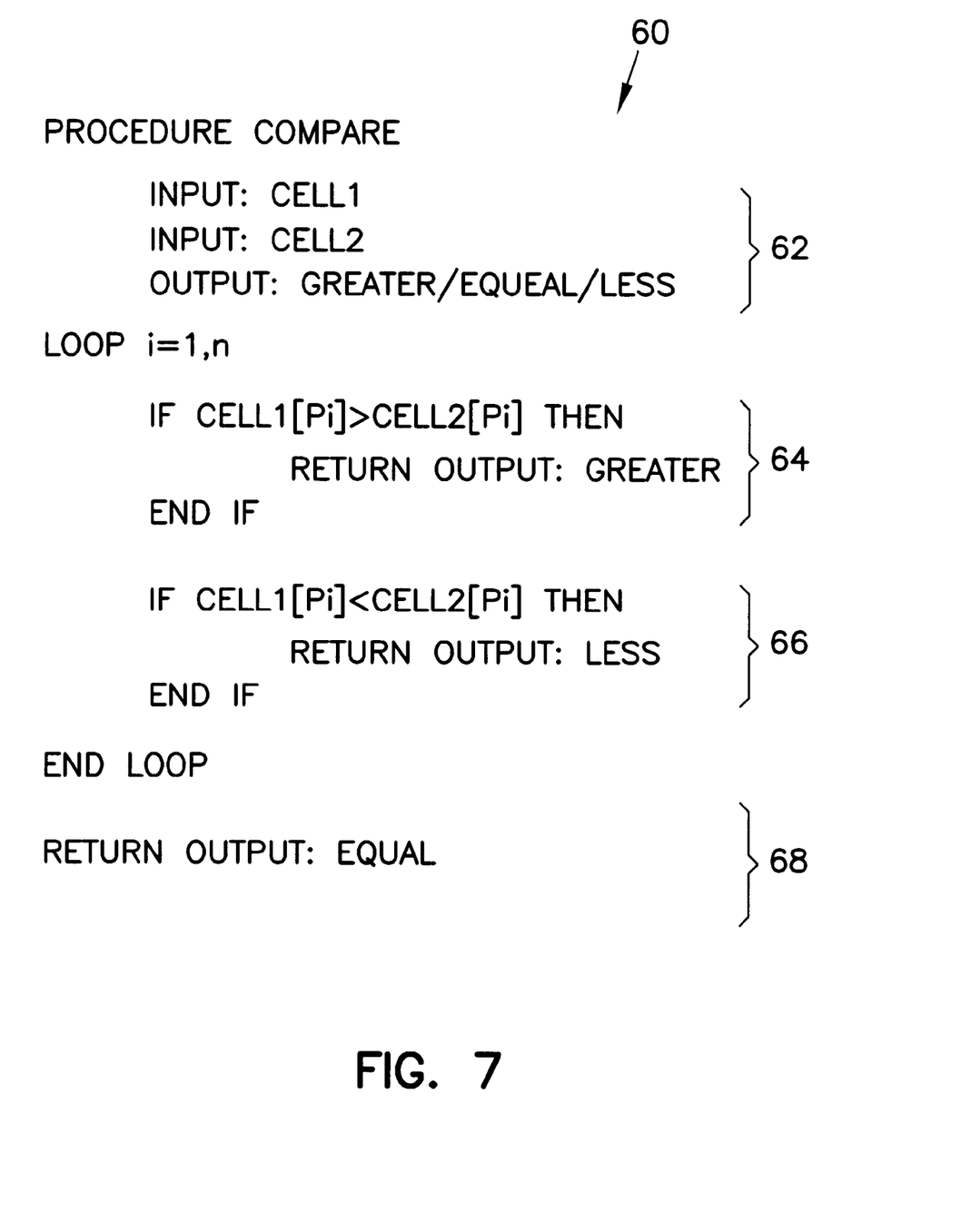
FIG. 7 illustrates an example procedure for ordering cells in a multidimensional data structure.

The system or procedure for ordering the cells based on the selected order of priority can be any sorting algorithm, such as but not limited to qsort, binary trees, and heap sort. Any sorting algorithm may employ a compare routine which can compare any two elements of the data array, to achieve linear ordering. In this example embodiment of the invention, the elements for comparison are cells. Referring to FIG. 7, there is illustrated a comparison procedure 60 according to one example embodiment of the invention. The procedure 60 is defined to receive as inputs a first (Cell1) and a second (Cell2) cell, and output a greater, equal or less parameter (62). In procedure 60, each level of a Cell1 is compared against the corresponding level of Cell2, in the order of priority selected, until a difference in level is found for a given dimension. If the level of Cell1 is thus determined to be greater, the "greater" parameter is output (64), if the level of Cell1 is thus determined to be lesser, the "lesser" parameter is output (66), and otherwise the output is "equal" (68).

For example, suppose the priorities are Continent—1, Year—2, Country—3, City—4, Quarter—5. This provides a permutation of (1, 4, 2, 3, 5), explained as follows:
Continent—Level 1 Priority 1
Year—Level 4 Priority 2
Country—Level 2 Priority 3
City—Level 3 Priority 4
Quarter—Level 5 Priority 5
Using procedure 60, the comparison of SF 1992/Q4 (1,1,2, 2,4) and Toronto 1992/Q3 (1,2,1,2,3), proceeds as follows:
1. Compare continent. America=America (1=1)
2. Compare year: 1992=1992 (2=2)
3. Compare Country: USA<Canada (1<2)
Therefore for chosen priorities, SF 1992/Q4 (1,1,2, 2,4) <Toronto 1992/Q3 (1,2,1,2,3).

For another example, consider the priorities set as follows: Continent—1, Year—2, Quarter—3, Country—4, City—5. In this case, procedure 70 provides that SF 1992/Q4 (1,1,2,2,4)>Toronto 1992/Q3 (1,2,1,2,3).

In the examples presented above, the mapping is a simple linear ordering. However, the invention is in no way limited in this respect, and mapping may be accomplished, for example but not by way of limitation, using a z-order curve, Hilbert order and Gray code techniques.

Furthermore, while the invention has been illustrated above with respect to two dimensional examples, the invention is fully extensible to higher levels of dimensions (i.e. 3, 4, 5 . . . ), as is readily apparent.

Thus, as described above, the invention provides for, among other things and without limitation:
1) Dividing the dimensions of the multidimensional space into levels, and prioritizing levels based on the deterministic probability that members of a level will be queried together.
2) Using the priorities, dividing the multidimensional space into regions or volumes (as used herein, the terms "region" and "volume" are used interchangeably, to refer to collections of cells in a space of two or more dimensions).
3) Mapping records or data from the volumes at every level to the one-dimensional space, using any multidimensional ordering (even independently of each other, so that data in each volume is clustered together when mapped to the one-dimensional storage medium.
4) Further, the priorities may be adjusted manually or automatically based on the history of actual OLAP queries to the multidimensional data, and the data remapped accordingly.

In addition, the invention provides for a data structure wherein data from a multidimensional space is stored in a one-dimensional space with data from volumes in the multidimensional space grouped in clusters, wherein volumes are defined by the priorities of levels in each of one or more dimensions of the multidimensional space.

As stated, it is preferred that data in a given volume be clustered together so as to be readable in a single access of the storage medium. However, it shall be understood that in actual practice the storage of the data may not be accessible in a single access due to limitations in the storage medium or the manner in which the storage medium is accessed or partitioned.

Thus, by clustering together data in groups that are most likely to be retrieved in a typical query, the invention improves the retrieval time for typical queries answered from multidimensional storage. However, the invention is not limited to any particular indexing scheme for the multidimensional storage. Such indexes are stored separately from the data, and may be separately created, stored and accessed. The order in which data is stored can, however, affect the effectiveness of using these indexes. Moreover, the manner of data ordering of the present invention affects such indexes at both the time of creation and time of retrieval of the data. More particularly, the size of the indexes may be advantageously reduced as a by-product of using the ordering scheme of the present invention.

Figure 8:
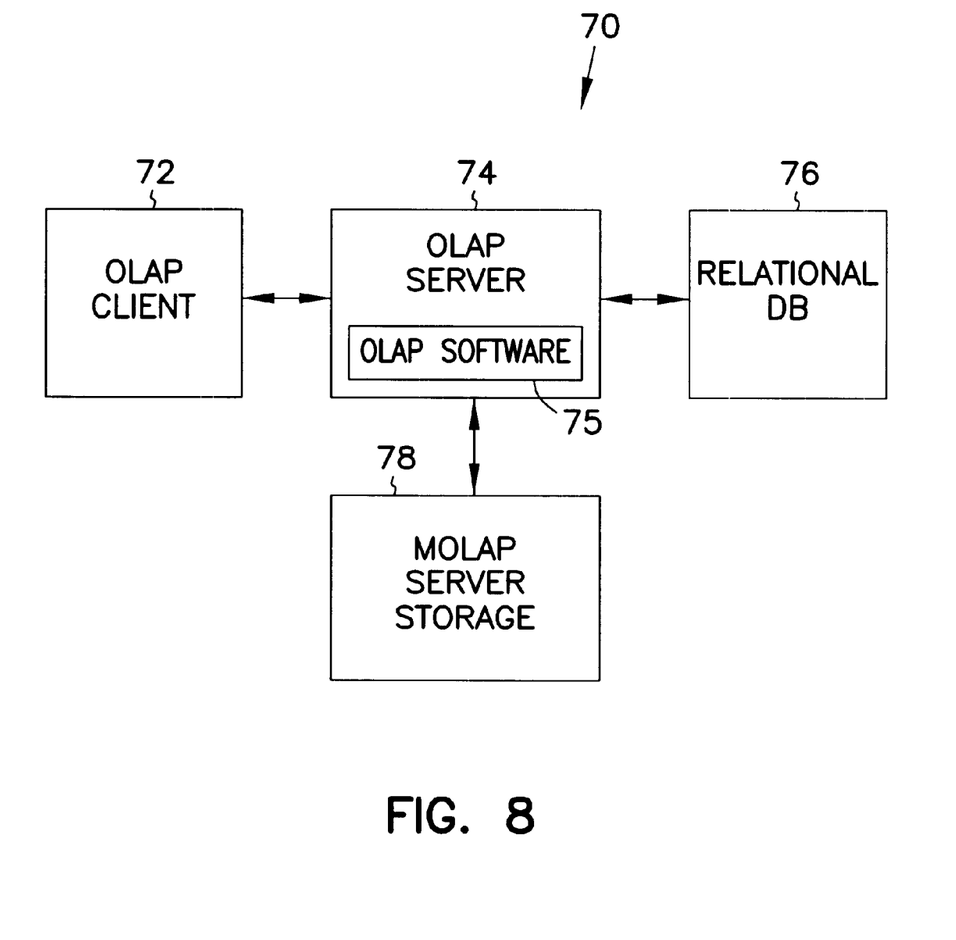
FIG. 8 illustrates an example OLAP system according to the present invention.

Referring now to FIG. 8, there is illustrated an example of an OLAP system embodying the present invention. OLAP system 70 includes an OLAP client 72, and OLAP server 74, a relational database store 76, and a multidimensional OLAP (MOLAP) data store 78. OLAP server 74 reads data from relational database store 76 and organizes it for storage in MOLAP data store 78. OLAP queries are received at OLAP server 74 from OLAP client 72. OLAP server 74 retrieves the desired data from the MOLAP data store 78, and renders it for viewing or other use by the user. Server 74 and client 72 are preferably implemented on a computing platform such as illustrated in FIG. 3.

In order to provide for the storage of data in the MOLAP data store 78 in accordance with the present invention, OLAP server 74 includes software 75 which allows a user to define levels and priorities used in the example embodiment of the invention as described above. The OLAP software 75 in turn provides for the segmentation of the multidimensional space into volumes and for the mapping of the multidimensional space into the one-dimensional storage of the MOLAP data store 78 according to the methodology of the invention. OLAP software 75 in one example embodiment also continuously monitors OLAP queries to the MOLAP data store 78, and collects data for use in redefining the level of priority of the levels, so that the efficiency of data ordering can be improved based on actual queries to the multidimensional space. As noted above, this reordering of the hierarchy may be done automatically, semi-automatically, or manually, based on actual queries, using software 75.

While the invention is illustrated by examples in two and three dimensional data spaces, it is readily extendable to any number of dimensions, and thus is in no way limited in this respect. Furthermore, the invention is not restricted to embodiment in an OLAP system, or in any way to a MOLAP data store. And, as noted above, the invention is in no way limited with respect to the manner in which data is mapped from the multidimensional space of a given volume to the one-dimensional space.

Thus, while the embodiments of the invention have been described with specific focus on their embodiment in an OLAP system in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal.

What is claimed is:

1. A method for storing multidimensionally organized data in a one-dimensional space in a storage medium, the multidimensionally-organized data having a first number of dimensions and comprising a plurality of cells, each of the cells being identifiable by a number of attributes equal to the first number, each of the attributes corresponding to one of the dimensions, the method comprising:

dividing the multidimensionally-organized data into two or more volumes based on a priority of at least two levels of at least one dimension of the multidimensionally-organized data, each of said levels representing a grouping of cells among the range of cells of the attribute that corresponds to said one dimension; and storing data from the multidimensional space in the storage medium with the data from each volume clustered together.

2. A method according to claim 1 wherein a dimension includes one or more levels.

3. A method according to claim 1 wherein the data in each volume is clustered according to a simple ordering.

4. A method according to claim 1 wherein the data in each volume is clustered according to an ordering of greater than one order.

5. A method according to claim 1 wherein the data in each volume is clustered according to an ordering selected from the group: the z-curve, Gray coding and Hilbert ordering.

6. An on-line analytical processing system wherein multidimensionally-organized data is stored in a one-dimensional space in a storage medium, the multidimensionally-organized data having a first number of dimensions and comprising a plurality of cells, each of the cells being identifiable by a number of attributes equal to the first number, each of the attributes corresponding to one of the dimensions, the multidimensionally-organized data divided into two or more volumes based on a priority of at least two levels of at least one dimension of the multidimensionally-organized data, each of said levels representing a grouping of cells among the range of cells of the attribute that corresponds to said one dimension, the multidimensionally-organized data stored in the storage medium with the data from each volume clustered together.

7. A system according to claim 6 wherein the processing system includes software operative to automatically adjust the priorities of levels based on actual queries presented to the system.

8. A system according to claim 6 wherein the data in each volume is clustered according to a simple ordering.

9. A system according to claim 6 wherein the data in each volume is clustered according to an ordering of greater than one order.

10. A system according to claim 6 wherein the data in each volume is clustered according to an ordering selected from the group: the z-curve, Gray coding and Hilbert ordering.

11. A data structure wherein multidimensionally-organized data is stored in a one dimensional space in a storage medium, the multidimensionally-organized data having a first number of dimensions and comprising a plurality of cells, each of the cells being identifiable by a number of attributes equal to the first number, each of the attributes corresponding to one of the dimensions, the multidimensionally-organized data divided into two or more volumes based on a hierarchy of members of at least one dimension of the multidimensionally-organized data, the multidimensionally-organized data stored in the storage medium with the data from each volume clustered together.

12. A data structure according to claim 11 wherein the data in each volume is clustered according to a simple ordering.

13. A data structure according to claim 11 wherein the data in each volume is clustered according to an ordering of greater than one order.

14. A data structure according to claim 11 wherein the data in each volume is clustered according to an ordering selected from the group: the z-curve, Gray coding and Hilbert ordering.

15. An on-line analytical processing system comprising:

a client;

a server;

a relational database;

a multidimensional data store;

wherein the client is connected to the server, and the server is connected to the relational data base; and the server including software operative on the server for storing data obtained from the relational database in the multidimensional data store, wherein multidimensionally-organized data to be accessed by the server is stored in a one-dimensional space in a storage medium, the multidimensionally-organized data having a first number of dimensions and comprising a plurality of cells, each of the cells being identifiable by a number of attributes equal to the first number, each of the attributes corresponding to one of the dimensions, the multidimensionally-organized data divided into two or more volumes based on a priority of at least two levels of at least one dimension of the multidimensionally-organized data, each of said levels representing a grouping of cells among the range of cells of the attribute that corresponds to said one dimension, the multidimensionally-organized data stored in the storage medium with the data from each volume clustered together.

16. A system according to claim 15 wherein the processing system includes software operative to automatically adjust the priority of levels based on actual queries presented to the system.

17. A computer program encoded in a computer readable medium, the computer program operative on a suitably configured computer for mapping multidimensionally-organized data to a one-dimensional space in a storage medium, the multidimensionally-organized data having a first number of dimensions and comprising a plurality of cells, each of the cells being identifiable by a number of attributes equal to the first number, each of the attributes corresponding to one of the dimensions, the computer program operative to divide the multidimensionally-organized data into two or more volumes based on a priority of at least two levels of at least one dimension of the multidimensionally-organized data, each of said levels representing a grouping of cells among the range of cells of the attribute that corresponds to said one dimension, and to store the multidimensionally-organized data stored in the storage medium with the data from each volume clustered together.

18. A computer program according to claim 17 wherein the computer program is further operative to automatically adjust the priority of levels of a dimension based on actual queries presented to the system.

* * * * *